(12) United States Patent
Lindgren et al.

(10) Patent No.: US 8,483,121 B2
(45) Date of Patent: Jul. 9, 2013

(54) METHOD FOR ENERGY SAVING IN A TELECOMMUNICATION SYSTEM

(75) Inventors: Stefan Lindgren, Vallda (SE); Sten Sjöberg, Landvetter (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 347 days.

(21) Appl. No.: 12/676,680

(22) PCT Filed: Sep. 5, 2007

(86) PCT No.: PCT/SE2007/050622
§ 371 (c)(1),
(2), (4) Date: Mar. 5, 2010

(87) PCT Pub. No.: WO2009/031956
PCT Pub. Date: Mar. 12, 2009

(65) Prior Publication Data
US 2010/0246462 A1    Sep. 30, 2010

(51) Int. Cl.
*H04B 7/185* (2006.01)
(52) U.S. Cl.
USPC .......................... 370/318; 455/522

(58) Field of Classification Search
USPC ................... 370/311, 318; 455/522
See application file for complete search history.

(56) References Cited

U.S. PATENT DOCUMENTS

| 2006/0184854 A1* | 8/2006 | Ihm et al. | 714/749 |
| 2008/0089450 A1* | 4/2008 | Zelst et al. | 375/344 |

FOREIGN PATENT DOCUMENTS

| JP | 2010-145842 A | 5/1998 |
| JP | 2005-352477 A | 12/2006 |
| JP | 2010-145842 A | 7/2010 |

* cited by examiner

*Primary Examiner* — Sai-Ming Chan

(57) ABSTRACT

The present invention relates to a method for energy saving in a telecommunication system with at least one first base station 24 for enabling communication within a first cell. A signal having a frame structure is transmitted in the first cell by the first base station 24. The structure of at least some frames comprises an overhead part with at least synchronization or system information. The first base station 24 is in a normal mode operated to transmit at least the overhead part so that it substantially reaches all user terminals within the first cell covering a first area 27. The method is particularly characterized in that the first base station 24 in a power saving mode is operated to transmit at least the overhead part so that it substantially reaches all user terminals within the first cell covering a second area 23 being larger than the first area 27.

15 Claims, 3 Drawing Sheets

METHOD FOR ENERGY SAVING IN A TELECOMMUNICATION SYSTEM

BACKGROUND

Mobile communication is one of the most important technologies for contributing to social and economic development around the world. Optimizing energy efficiency will not only reduce environmental impact, it will also cut network costs which will give benefits for all using the mobile systems.

Capital expenditure typically represents a very small portion of the total cost of the ownership. Instead, the long term savings from site reduction and efficient operation is significant, with a significant reduction in energy consumption as a key issue.

Optimizing solutions for reducing energy consumption means that every stone has to be turned over. Still, the total network solution is greater than the sum of their parts. This means that combining the best components in a package does not always give the best results. In the radio base station the relative energy consumption of the different components vary on the dependency of the properties of the components it has to work with.

Typical sources of energy consumption in the base station are signal processing, RF conversion, power amplification, power supply, climate equipment (air conditioning) and feeder. For instance, In traditional base stations the equipment is located on the ground which means that the antennas has to be fed using several meters of cable. Half of the emitted power can be lost in the feeders. By placing the equipment in the top of the tower, significant reductions in energy consumption is achieved. The equipment can be combined with a battery back-up unit that minimizes hardware and energy consumption.

One way of reducing the energy consumption is to avoid unnecessary DC/DC conversion and reduce the need of cooling fans and cooling systems. Modules based on digital power management can also reduce energy consumption.

Another way in which energy reduction can be achieved is through the use of stand-by modes. Base station sites are dimensioned to cope with peak hours. In a cell a number of TRX (transmitters) can run at the same time. Using power management schemes, some TRX can be put in stand-by instead of running in idling mode during low traffic hours.

Network design is a key issue improving the energy efficiency. In order to achieve an energy-efficient design a number of issues have to be addressed from start. At first, the true network needs has to be addressed. No amount of energy efficiency at the component level can make up for an inefficiently deigned network. For instance the number of radio base stations should be optimized for the coverage and quality that needs to be achieved.

The exact coverage, capacity and quality have to be considered before getting into considerations about individual sites and equipment specifications. Moreover, the current and future business environment needs has to be considered, considering the possibility to rebuild or expand sites. Once these factors have been considered the operator should begin the network design process, looking into the total cost of the ownership and the alternative design options.

The radio base stations use a large amount of energy. The main task of the base transceiver station is to enable communication with the user's terminal being positioned in the cell. The cells are served by radio transceivers arranged in a base station. These cells are used to cover different areas in order to provide radio coverage over a wider area that the area of one cell.

FIG. 1 shows the cellular structure in a telecommunication radio network. In the lower part of FIG. 1 is a separate cell with a base station disclosed for clarity reasons. The cells 10,11 overlap 12 to avoid areas without coverage. There are various solutions for distinguish the signals from different transmitters in the different base stations, such a Code Division Multiple Access (CDMA) and Frequency Division Multiple Access (FDMA). Handover is used between the cells for moving user terminals.

The smaller cells 10 are used within city centres where there are a lot of buildings which shields the signal and where there are a lot of users. With smaller cells more channels are available in a certain geographical area which enables communication with more users. The smaller cells provide radio coverage and additional capacity where there are high numbers of users. The base station 13 antennas for these smaller cells are mounted at street level, typically on the external walls of existing structures, lamp posts and other street furniture. Typically, these cells provide radio coverage across smaller distances and are placed 300 m-1000 m apart. They have an output in the range of a few watts.

The larger cells 11 provide the main coverage in a mobile network. The antennas for the larger cells are mounted on ground-based masts, rooftops and other existing structures. They must be positioned at a height that is not obstructed by surrounding buildings and terrain. Large cells base stations have a typical power output of tens of watts. These cells also cover the countryside where there are less obstacle and less users per area unit.

Since the cell covers a geographical area, the transmitting power of the transceivers is a function of the coverage of the transmitted signals enabling the communication. An obstacle in the area which shields the transmitted signals means that the power may have to be increased even more to provide the quality of service that the operator aims for.

In addition to the expanding telecommunication network requiring more and more base stations, there is an increasing need of delivering wireless technology with broadband capacity for cellular networks. A good broadband system must fulfil certain criteria, such as high data rate and capacity, low cost per bit, good Quality of Service and greater coverage. High Speed Packet Access (HSPA) and Mobile WiMAX are examples two network access technologies that enable this.

These modern standards have very high capacity in terms of users and throughput, which requires a large amount of energy. In order to achieve high data throughput in the cellular systems a dense cell plan has to be deployed. A base station for modern standards consumes considerable amount of power, typical 65000 kWh per station and year.

For instance mobile WiMAX transmitted via base stations uses Scalable Orthogonal Frequency Division Multiple Access (SOFDMA) with Time Division Duplex (TDD). FIG. 2 shows a schematic view of a frame structure for OFDMA (on which SOFDMA is based) when operating in TDD mode. Some WiMAX systems support OFDMA operating in Frequency division duplexing (FDD) in which the frame structure differs from TDD in that the uplink and downlink frames are transmitted at the same time over different carriers. The frame (Frame N) comprises a downlink subframe 15, a following uplink subframe 16, a small guard interval 20 between the downlink and uplink subframe and an end interval 22 between the uplink and the downlink subframe of the next frame.

The downlink subframe 15 in TDD begins with overhead information for informing the user device about the characteristics of the system. The overhead comprises synchronization information 17 or system information 18. The overhead is followed by data regions 19 for the downlink data traffic in the downlink subframe. A guard interval 20 is followed by an uplink subframe 21 with data regions for the uplink data traffic from the different user devices. Finally there is the end interval 22 followed by the overhead synchronization information 17 of the next frame.

In WiMAX particularly the overhead begins with a downlink preamble that is used for physical-layer procedures (cell detection, time and frequency synchronization). The preamble is followed by a frame control header providing frame configuration and system information (modulation and coding maps) to find where and how to decode downlink and uplink. The frame control header and maps are sent for each available data region 19, 21.

In order to achieve high data throughput in cellular systems, high order modulation, e.g. 64 QAM and high transmit power is used at the base station. The physical resources in term of subcarriers and time are kept to a minimum to maximize the user data throughput. High performance power amplifier is needed to keep the signal properties after the amplification. Especially the linearity of the amplification is important. This requires a lot of energy which increases the energy consumption of the base station. Due to these requirements the amplifier efficiency is low and contributes to a large extent the base station power consumption.

During low load or no load scenarios the base station still needs to transmit the system and synchronization information 17,18 to serve the attached user terminals and so a new terminal can access the system. The information has to be transmitted with enough power to reach all user terminals within the cell and is therefore transmitted with low modulation order and high output power. Due to these transmissions the base station power consumption is still quite significant.

SUMMARY

The object of the present invention is to increase the energy efficiency in cellular radio network.

The present invention relates to a method for energy saving in a telecommunication system with at least one first base station for enabling communication within a first cell. A signal having a frame structure is transmitted in the first cell by the first base station. The structure of at least some frames comprises an overhead part with at least synchronization or system information. The first base station is in a normal mode operated to transmit at least the overhead part so that it substantially reaches all user terminals within the first cell covering a first area.

The method is particularly characterized in that the first base station in a power saving mode is operated to transmit at least the overhead part so that it substantially reaches all user terminals within the first cell covering a second area being larger than the first area.

The invention also relates to a node in the telecommunication system with at least one first base station for enabling communication within a first cell. The first base station is adapted to transmit a signal having a frame structure in the first cell. The structure of at least some frames comprises an overhead part with at least synchronization or system information. The first base station is in normal mode operated to transmit at least the overhead part so that it substantially reaches all user terminals within the first cell covering a first area.

What particularly characterizes the node is that it is adapted to control so that the first base station in the power saving mode is operated to transmit at least the overhead so that it reaches all user terminals within the first cell covering a second area being larger than the first area.

The invention also relates to a telecommunication system with at least one first base station for enabling communication within a first cell. The first base station is adapted to transmit a signal having a frame structure in the first cell. The structure of at least some frames comprises an overhead part with at least synchronization or system information. The first base station is in normal mode operated to transmit at least the overhead part so that it substantially reaches all user terminals within the first cell covering a first area.

What particularly characterizes the system is that it is adapted to control so that the first base station in the power saving mode is operated to transmit at least the overhead so that it reaches all user terminals within the first cell covering a second area being larger than the first area.

The advantage of the present invention is that the introduction of flexible cell structure and base station sleep mode, the power consumption is drastically decreased. The invention can be introduced in existing cellular standards without change of the air interface standards.

BRIEF DESCRIPTION OF DRAWINGS

In the following text the invention will be described in detail with reference to the attached drawings. These drawings are used for illustration only and do not in any way limit the scope of the invention.

DETAILED DESCRIPTION

Figure 1:
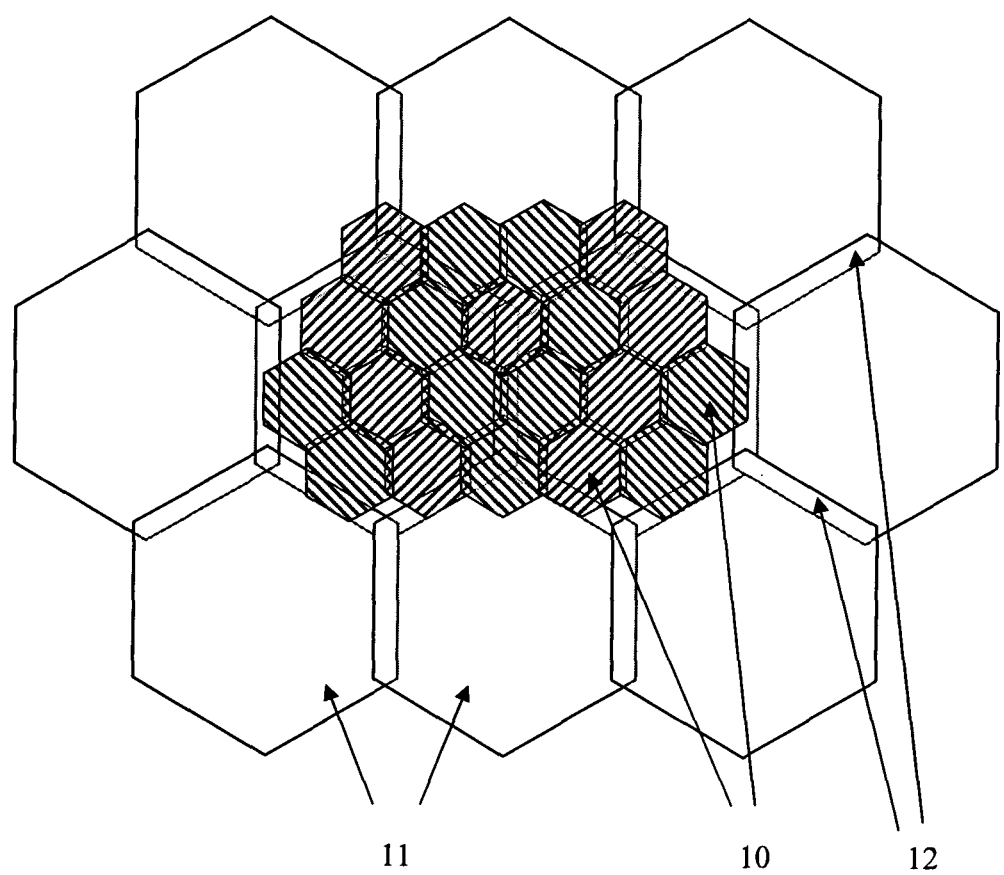
FIG. 1 shows the cellular structure in a telecommunication radio network.
Figure 1:
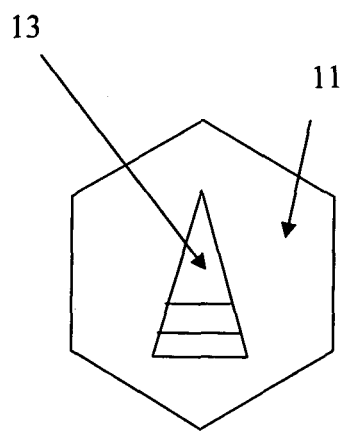
Figure 2:
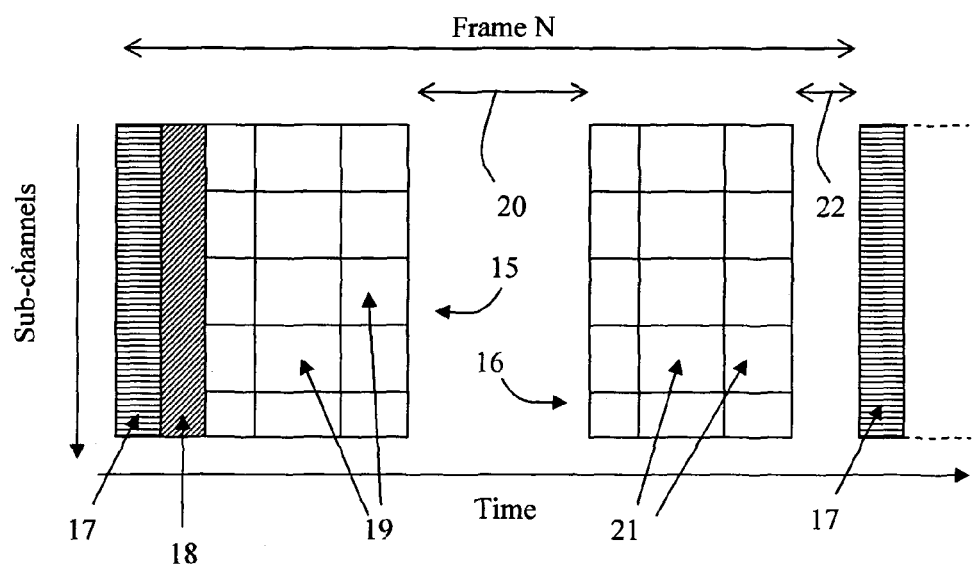
FIG. 2 shows a detailed schematic view for the OFDMA frame structure when operating in TDD mode.

The invention will now be described in detail with reference to embodiments described in the detailed description and shown in the drawings. FIGS. 1 and 2 have already been described in relation to Background above.

The embodiments refer to a method for energy saving in a telecommunication system. The telecommunication system and node are adapted for performing said method described herein.

Figure 3:
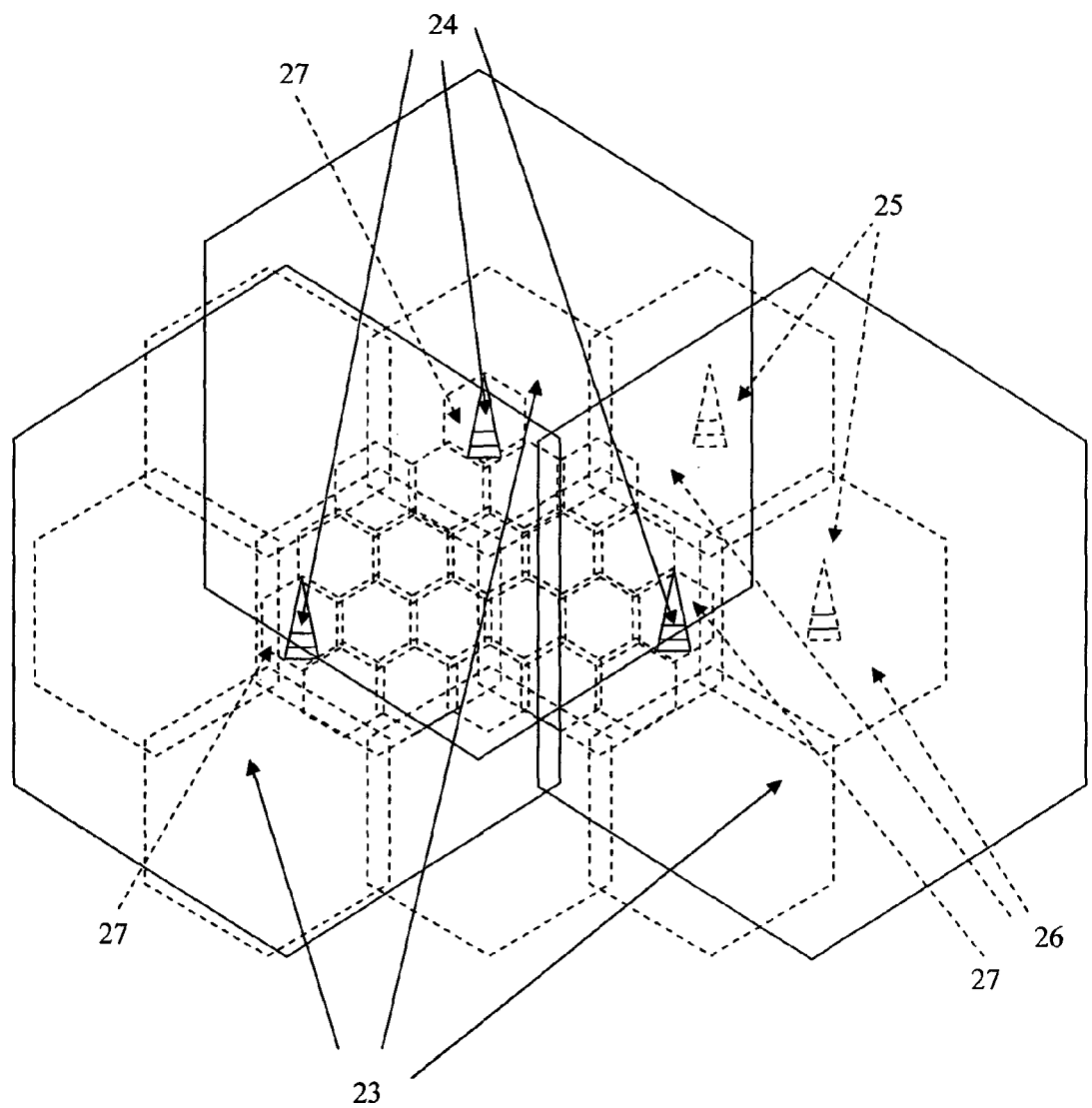
FIG. 3 shows the cellular structure in the telecommunication network according to the present invention.

The present invention relates to a method for energy saving in a telecommunication system with at least one first base station 24, see FIG. 3, for enabling communication within a first cell. The first cells are served by radio transceivers arranged in the base station 24. These cells are used to cover different areas in order to provide radio coverage over a wider area that the area of one cell.

FIG. 1 shows the cellular structure in a telecommunication radio network. In the lower part of FIG. 1 is a separate cell with a base station disclosed for clarity reasons. The cells 10,11 overlap 12 to avoid areas without coverage.

The first base station 24, see FIG. 3, transmits a signal having a frame structure in the first cell. The structure of at least some frames comprises an overhead part with at least synchronization (17) and system (18) information. It is not necessary that all frames contain an overhead part. For instance in GSM, which is one of the telecommunication systems in which the present invention can be implemented, only some of the frames contains an overhead part. In other systems, such as WiMAX, all frames contain an overhead part. Consequently, a person skilled in the art should realize that all telecommunication systems are included within the scope of the invention.

The embodiment shown in FIG. 2, which relates to TDD, comprises a subframe 15 followed by a subframe 16. The frame structure in TDD is divided into a downlink subframe a following uplink subframe, a small guard interval 20 (see FIG. 2) between the downlink and uplink subframe and an end interval 22 (see FIG. 2) between the uplink and the downlink subframe of the next frame. It should however be understood by the person skilled in the art that the feature subframe also includes embodiments with FDD, in which the subframes are divided by frequency instead, or other technologies for duplex.

The first base station 24, see FIG. 3, in normal mode is operated to transmit at least the overhead part so that it substantially reaches all user terminals within the first cell covering a first area 27. The first geographical area is the default area for normal operation. Substantially reaching all user terminals means that there might be user terminals within the cell which from which the transmitted signals are shielded (for instance by a concrete wall). The feature "reaches all user terminals within the first cell" is used to define the first area. This means that the coverage of the overhead part, which is transmitted with at least some of the cells, defines the first area.

The object of the present invention is to increase the energy efficiency in cellular radio network. The scope of the present invention is therefore that the first base station 24, see FIG. 3, in a power saving mode is operated to transmit at least the overhead 17,18 so that it reaches all user terminals within the first cell covering a second area 23 being larger than the first area 27. As seen in FIG. 3, three base stations 24 increases the area 27 of the respective cell significantly. Also the second area is defined by the coverage of the overhead part, which is transmitted with at least some of the cells.

The advantage is that the introduction of flexible cell 23,27 structure and power saving sleep mode, the power consumption of the cellular system is drastically decreased. The invention can be introduced in existing cellular standards without change of the air interface standards. As will be described the increase of the cell area to a second, larger area 23 is combined with an interruption of transmitting in other base stations 25.

In normal mode the first base station 24 transmits with a first power level and in the power saving mode transmits with a second power lever being higher than the first power level. This is one option how to increase the area 27 of the cells. Another option is that the first base station 24 in the normal mode transmits via a first antenna device and in the power saving mode transmits via a second antenna device. Different antennas have different properties, and by using different antenna devices (they may be combined) a variation in area size is enabled. The fact that the same base station 24 is used for increasing the cell size means that the second larger area 23 will overlap the first area 27.

In order to achieve the power saving on a system level there is at least a second base station 25 which in a normal mode is operated to transmit at least the overhead so that it substantially reaches all user terminals within a cell covering a third area 26. Also the third area is defined by the coverage of the overhead part, which is transmitted with at least some of the cells.

By interrupting the transmitting from the second base station in power saving mode a significant energy saving is achieved. A majority of base stations 25 may be switched off during power saving mode, and the cells with a third area 26 during the power saving mode is also substantially overlapped by the second area 23. Thereby, as exemplified in FIG. 3, by switching off 27 out of 30 base stations 25, a significant amount of energy will be saved even though these three has to increase their cell area 23. As can be seen, the second area 23 overlaps areas 26, 27 of different size which means that base stations serving both smaller and larger cells can be part of the power saving operation.

As an option the base station 24 may increase or decrease the second area 23 in which the first base station transmits at least the overhead. Thereby, if the number of cells increases in the system, the same base stations 24 still serves in power saving mode.

As an option the signal transmitted, having a frame structure, contains an overhead part 17, 18 in each transmitted signal. In GSM some frames contain an overhead part while in other systems such as WiMAX all frames contains an overhead part.

The overhead part needs to be transmitted in order for the user terminal to receive synchronization or system information. If some base stations 25 are interrupted, the base stations 24 operating in power saving mode must make sure that at least the overhead 17,18 substantially reaches all user terminals within the second cell 23 substantially overlapping the third cell 26.

The power saving mode is activated by the system at certain operating conditions such as the level of usage for the cell capacity, the number of user terminals in the cell and/or statistics of cell usage over time. The first base station 24 would typically switch between normal mode and power saving mode by some management commands from a management node. Management commands will also interrupt the operation of the second base station 25 during the power saving mode. When at least one of the second base stations should be awakened from the interruption period during the power saving mode, management commands are also used. During the interruption period, the second base station has the capability to receive some "wake-up" commands, power up and resume normal operation. It may be that only some of the base stations switch to or from power saving mode. This for instance depends on the power saving setting is the system, for instance made by the operator.

The intent of the present invention is to monitor the system continuously and if the traffic load goes down for a period of time the power saving mode may be activated. Using statistics of traffic load over time will also be very useful. For instance it may be that an operator has monitored a low traffic load in a certain cell at night between midnight and 06.00 in the morning. The operator may then via a management system modify the operation of this base station so that the power saving mode is activated every night between midnight and 06.00. The system may also be modified so that if the traffic load is below a certain level the power saving mode is activated. It is the operator that decides which quality of service that will be provided at certain conditions.

The power saving mode is controlled by an algorithm which is loaded into the system in order to enable said method for energy saving.

The invention also relates to a node in the telecommunication system with at least one first base station 24 for enabling communication within a first cell. The first base station 24 is adapted to transmit a signal having a frame structure in the first cell. The structure of at least some frames comprises an overhead part with at least synchronization 17 or system 18 information. The first base station 24, see FIG. 3, in normal mode is operated to transmit at least the overhead part 17,18 so that it substantially reaches all user terminals within the first cell 10,11 covering a first area 27.

What particularly characterizes the node is that it is adapted to control so that the first base station 24 in the power saving mode is operated to transmit at least the overhead 17,18 so that it reaches all user terminals within the first cell covering a second area 23 being larger than the first area 27. The node may comprise an algorithm which controls the power saving mode.

The invention also relates to a telecommunication system with at least one first base station 24 for enabling communication within a first cell. The first base station 24 is adapted to transmit a signal having a frame structure in the first cell. The structure of at least some frames comprises an overhead part with at least synchronization 17 or system 18 information. The first base station 24, see FIG. 3, in normal mode is operated to transmit at least the overhead part 17,18 so that it substantially reaches all user terminals within the first cell 10,11 covering a first area 27.

What particularly characterizes the system is that it is adapted to control so that the first base station 24 in the power saving mode is operated to transmit at least the overhead so that it reaches all user terminals within the first cell covering a second area 23 being larger than the first area 27. The node may comprise an algorithm which controls the power saving mode.

It will also be appreciated by the person skilled in the art that various modifications may be made to the above-described embodiments without departing from the scope of the present invention.

There are no particular demands on the first base stations 24 being able to switch between "low" power normal mode and "high" power, power saving mode apart from the capability to provide the desired coverage of the second area 23.

A variant of the disclosed embodiment is that the first cells 24 during the power saving mode to provide a large second area 23 coverage switches to a more robust coding and modulation scheme.

The invention claimed is:

1. A method for energy saving in a telecommunication system with at least one first base station for enabling communication within a first cell, the method comprising:
   transmitting, by the first base station, a signal having a frame structure in the first cell,
   wherein the structure of at least some frames comprises an overhead part with at least synchronization or system information,
   transmitting, by the first base station in a normal mode, at least the overhead part so that it substantially reaches all user terminals within the first cell covering a first area,
   transmitting, by the first base station in a power saving mode, at least the overhead part so that it substantially reaches all user terminals within the first cell covering a second area being larger than the first area.

2. The method according to claim 1 wherein the first base station in the normal mode transmits with a first power level and in the power saving mode transmits with a second power level being higher than the first power level.

3. The method according to claim 1 wherein the first base station in the normal mode transmits via a first antenna device and in the power saving mode transmits via a second antenna device.

4. The method according to claim 1 wherein the second area overlaps the first area.

5. The method according to claim 1 wherein at least a second base station in a normal mode is operated to transmit at least the overhead part so that it substantially reaches all user terminals within a second cell covering a third area, the transmitting from the second base station in power saving mode being interrupted.

6. The method according to claim 5 wherein the second area during the power saving mode also substantially overlaps at least the third area.

7. The method according to claim 1 wherein the second area overlaps areas of different size.

8. The method according to claim 1 wherein the size of the second area in which the first base station transmits at least the overhead, can decrease or increase.

9. The method according to claim 1 wherein said overhead part is contained in each transmitted signal.

10. The method according to claim 1 wherein the power saving mode is activated at certain operating conditions such as the level of usage for the cell capacity, the number of user terminals in the cell and/or statistics of cell usage over time.

11. The method according to claim 1 wherein the power saving mode is controlled by an algorithm.

12. A node in a telecommunication system with at least one first base station for enabling communication within a first cell,
   the first base station being adapted to transmit a signal having a frame structure in the first cell,
   the structure of at least some frames comprising an overhead part with at least synchronization or system information,
   the first base station in a normal mode being operated to transmit at least the overhead part so that it substantially reaches all user terminals within the first cell covering a first area,
   the node being adapted to control so that the first base station in a power saving mode is operated to transmit at least the overhead part so that it substantially reaches all user terminals within the first cell covering a second area being larger than the first area.

13. The node according to claim 12 wherein the node comprises an algorithm controlling the power saving mode.

14. A telecommunication system with at least one first base station for enabling communication within a first cell,
   the first base station being adapted to transmit a signal having a frame structure in the first cell,
   the structure of at least some frames comprising an overhead part with at least synchronization or system information,
   the first base station in a normal mode being operated to transmit at least the overhead part so that it substantially reaches all user terminals within the first cell covering a first area,
   the system being adapted to control so that the first base station in a power saving mode is operated to transmit at least the overhead part so that it substantially reaches all user terminals within the first cell covering a second area being larger than the first area.

15. The telecommunication system according to claim 14 wherein the system comprises an algorithm controlling the power saving mode.

* * * * *